(12) United States Patent
Yoshida

(10) Patent No.: US 8,156,827 B2
(45) Date of Patent: Apr. 17, 2012

(54) EXTERNAL FORCE DETECTION DEVICE

(75) Inventor: Koichi Yoshida, Yokohama (JP)

(73) Assignee: Murata Manufacturing Co., Ltd., Kyoto (JP)

(*) Notice: Subject to any disclaimer, the term of this patent is extended or adjusted under 35 U.S.C. 154(b) by 467 days.

(21) Appl. No.: 12/403,437

(22) Filed: Mar. 13, 2009

(65) Prior Publication Data
US 2009/0241694 A1 Oct. 1, 2009

(30) Foreign Application Priority Data

Mar. 25, 2008 (JP) ................. 2008-078545

(51) Int. Cl.
*G01L 1/04* (2006.01)
(52) U.S. Cl. .................................. 73/862.629
(58) Field of Classification Search .......... 73/862.625–862.642, 777
See application file for complete search history.

(56) References Cited

U.S. PATENT DOCUMENTS

| | | | |
|---|---|---|---|
| 5,417,235 A * | 5/1995 | Wise et al. | 137/1 |
| 5,561,248 A * | 10/1996 | Negoro | 73/514.32 |
| 5,629,244 A * | 5/1997 | Matsuzaki | 438/52 |
| 6,201,284 B1 * | 3/2001 | Hirata et al. | 257/415 |
| 2003/0209075 A1 | 11/2003 | Okada | |
| 2004/0016981 A1 | 1/2004 | Yoshida et al. | |
| 2004/0093946 A1 | 5/2004 | Kano et al. | |

FOREIGN PATENT DOCUMENTS

| | | |
|---|---|---|
| EP | 1 868 000 A1 | 12/2007 |
| JP | 2001-308073 A | 11/2001 |
| JP | 2003-329702 A | 11/2003 |
| JP | 2004-109114 A | 4/2004 |
| JP | 2004-125616 A | 4/2004 |
| JP | 2004-170260 A | 6/2004 |
| JP | 2004-294230 A | 10/2004 |
| JP | 3956999 B2 | 8/2007 |

OTHER PUBLICATIONS

Official Communication issued in corresponding Japanese Patent Application No. 2008-078545, mailed on Mar. 9, 2010.
Official Communication issued in corresponding Japanese Patent Application No. 2008-078545, mailed on Aug. 3, 2010.

* cited by examiner

*Primary Examiner* — Max Noori
(74) *Attorney, Agent, or Firm* — Keating & Bennett, LLP

(57) ABSTRACT

An external force detection device includes a weight portion, a supporting portion, and a beam portion provided in an SOI substrate which includes an upper layer and a lower layer that are capable of being etched with a first etching gas and sandwich an intermediate layer that is capable of being etched with a second etching gas. The weight portion is displaced in accordance with an external force to cause the beam portion to deform. The upper layer in a gap portion between the weight portion and the supporting portion is etched. The lower layer in the gap portion and the lower layer below the beam portion are etched. The intermediate layer in the gap portion is then etched. The groove formed by etching the upper layer has a multidirectional two-dimensional shape.

6 Claims, 5 Drawing Sheets

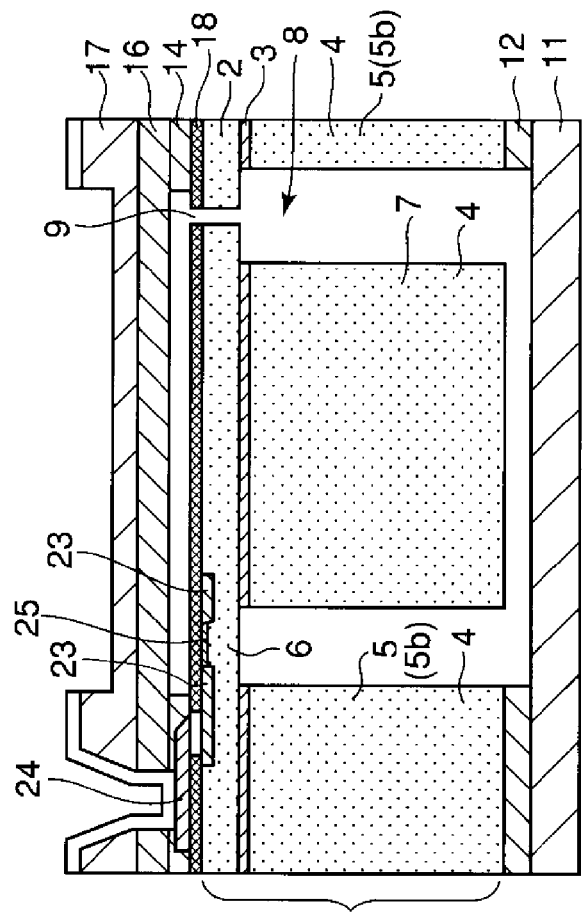
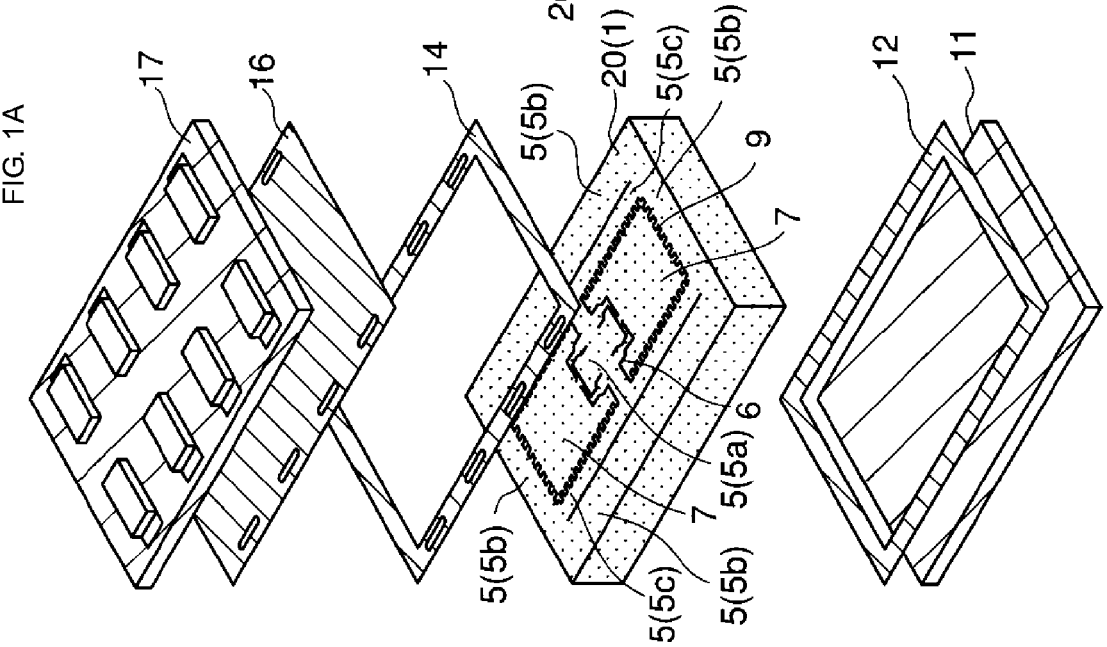

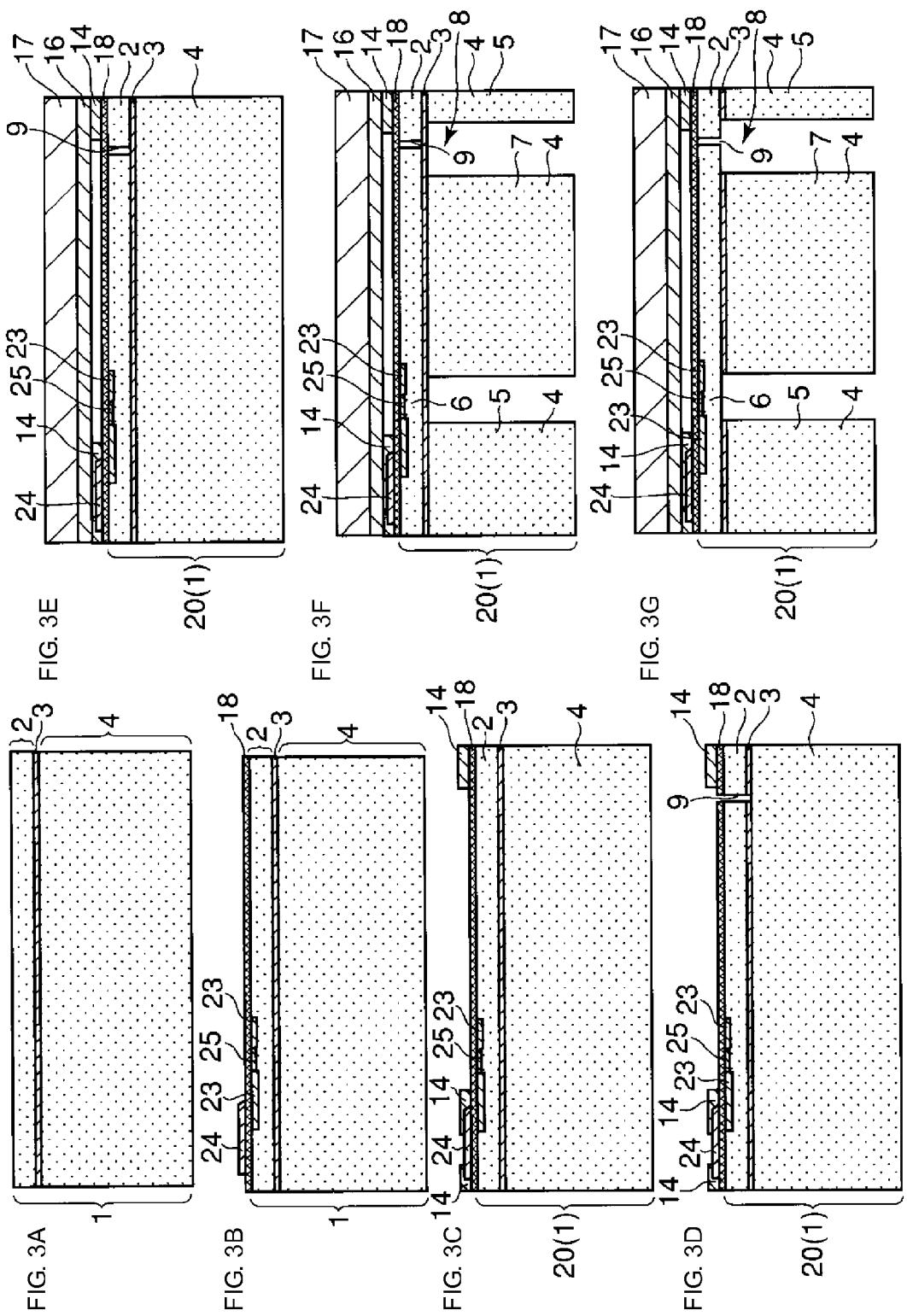

EXTERNAL FORCE DETECTION DEVICE

BACKGROUND OF THE INVENTION

1. Field of the Invention

The present invention relates to a method for manufacturing an external force detection device used for an acceleration sensor and the external force detection device.

2. Description of the Related Art

As shown in a sectional view of FIG. 5D, a device including a weight portion 7, a supporting portion 5 arranged so as to be spaced apart from the weight portion 7, and a beam portion 6 that connects the supporting portion 5 to the weight portion 7 at one or more connecting points (one connecting point in FIG. 5D) is known as one example of an external force detection device used for an acceleration sensor or other suitable device. The beam portion 6 is configured so as to be thinner than the weight portion 7. As shown in FIGS. 5D and 5E, a space in which the weight portion 7 can move is provided around the weight portion 7. In this type of an external force detection device, the weight portion 7 is displaced in accordance with an external force to cause the beam portion 6 to deform. Such an external force detection device is used for various devices, such as an acceleration sensor as disclosed in Japanese Patent No. 3956999 and Japanese Unexamined Patent Application Publication Nos. 2004-125616 and 2004-109114, for example.

The weight portion 7, the supporting portion 5, and the beam portion 6 are provided in, for example, a silicon-on-insulator (SOI) substrate. As shown in FIG. 5A, an SOI substrate 1 is a multi-layered substrate in which a lower layer 4 (supporting layer) made of silicon (Si), an intermediate layer 3 (BOX layer) made of silicon oxide ($SiO_2$), and an upper layer 2 (SOI layer) made of Si are stacked in sequence. In other words, the upper layer 2 and the lower layer 4 sandwich the intermediate layer 3.

The upper layer 2 and the lower layer 4 are made of Si and can be etched with a first etching gas that is capable of removing Si. On the other hand, the intermediate layer 3 is made of $SiO_2$ and can be etched with a second etching gas different from the first etching gas, but cannot be etched with the first etching gas.

For example, the formation of the weight portion 7, the supporting portion 5, and the beam portion 6 using the SOI substrate 1 is described with reference to FIGS. 5B to 5D. As shown in FIG. 5B, a groove 9 is formed by etching, with the first etching gas, the upper layer 2 in a gap portion 8 between the weight portion 7 and the supporting portion 5 that define the external force detection device (a step of etching an upper layer). As shown in FIG. 5E, the groove 9 is formed in a straight line.

As shown in FIG. 5C, the lower layer 4 in the gap portion 8 and the lower layer 4 below the beam portion 6 are etched with the first etching gas (a step of etching a lower layer). The lower layer 4 in the gap portion 8 is etched such that the etched portion is wider than the groove 9. As a result, the weight portion 7 is connected to the supporting portion 5 through the beam portion 6 (e.g., cantilevered in this drawing), and only the intermediate layer 3 remains unetched in the gap portion 8 between the supporting portion 5 and the weight portion 7.

As shown in FIG. 5D, the intermediate layer 3 in the gap portion 8 is then etched with the second etching gas (a step of etching an intermediate layer), whereby the weight portion 7 is separated from the supporting portion 5 through the gap portion 8. Furthermore, the intermediate layer 3 below the beam portion 6 is optionally etched with the second etching gas. Consequently, the weight portion 7, the beam portion 6, and the supporting portion 5 of the example of an external force detection device described above can be formed.

In the step of etching a lower layer shown in FIG. 5C, the lower layer 4 is gradually etched from the lower side thereof (that is, from the lower side of the SOI substrate 1). However, the unstable etching rate causes a state in which the lower layer 4 on the intermediate layer 3 that remains unetched has a non-uniform thickness. If a groove 9 with a simple straight line shown in FIG. 5E is formed above the intermediate layer 3, stress is non-uniformly applied to the intermediate layer 3. As a result, the stress is concentrated in a region where the groove 9 is formed, represented by arrows F in FIG. 5E.

The intermediate layer 3 may be locally ruptured at that region before the step of etching an intermediate layer. The shock caused by the rupture may break off the beam portion 6, which may also cause the weight portion 7 to jut out from the substrate. Thus, the manufacturing yield of an external force detection device may be reduced or an external force detection device that does not conform to standards may be produced.

SUMMARY OF THE INVENTION

To overcome the problems described above, preferred embodiments of the present invention provide a method for manufacturing an external force detection device at a high yield and an external force detection device that can be manufactured at a high yield.

A method for manufacturing an external force detection device according to a preferred embodiment of the present invention includes a weight portion, a supporting portion arranged so as to be spaced away from the weight portion, and a beam portion that is thinner than the weight portion, the beam portion connecting the supporting portion to the weight portion at least one connecting point. A space in which the weight portion can move is provided around the weight portion so that the weight portion is displaced in accordance with an external force to cause the beam portion to deform. The method includes the steps of preparing a substrate in which the weight portion, the supporting portion, and the beam portion are to be formed, the substrate including at least three layers in which an upper layer that can be etched with a first etching gas and a lower layer that can be etched with the first etching gas sandwich an intermediate layer that can be etched with a second etching gas different from the first etching gas, but cannot be etched with the first etching gas, etching the upper layer in a gap portion between the weight portion and the supporting portion, with the first etching gas so as to form a groove, etching the lower layer in the gap portion and the lower layer below the beam portion, with the first etching gas, and subsequently etching the intermediate layer in the gap portion, with the second etching gas, wherein the groove formed by etching the upper layer has a multidirectional two-dimensional shape.

The external force detection device according to a preferred embodiment of the present invention includes a weight portion, a supporting portion arranged so as to be spaced away from the weight portion, and a beam portion thinner than the weight portion, the beam portion connecting the supporting portion to the weight portion at least one connecting point. In the external force detection device, a space in which the weight portion can move is provided around the weight portion, the weight portion is displaced in accordance with an external force to cause the beam portion to deform, and an etched groove defines a gap portion between the weight portion and the supporting portion, and wall surfaces of the groove have a three-dimensional structure.

The external force detection device according to a preferred embodiment of the present invention includes the weight portion, the supporting portion arranged so as to be spaced away from the weight portion, and the beam portion thinner than the weight portion that connects the supporting portion to the weight portion at least one connecting point. In the external force detection device, the etched groove defines a gap portion between the weight portion and the supporting portion, and wall surfaces of the groove have a three-dimensional structure. Thus, the external force detection device can be manufactured at a high yield using the method for manufacturing an external force detection device according to a preferred embodiment of the present invention.

In the method for manufacturing an external force detection device according to a preferred embodiment of the present invention, the weight portion, the supporting portion, and the beam portion that define the external force detection device are formed using a substrate having at least three layers having the upper layer, the intermediate layer, and the lower layer. This method includes the step of etching, with the first etching gas, the lower layer in the gap portion between the weight portion and the supporting portion and the lower layer below the beam portion. The unstable etching rate in this step causes a state in which the lower layer that remains unetched on the intermediate layer has a non-uniform thickness. If a groove with a simple straight line is formed above the intermediate layer in the step of etching the upper layer as in the related art, stress is concentrated in the region extending along the groove. As a result, the intermediate layer may be locally ruptured at that region before the etching step. However, in a preferred embodiment of the present invention, the groove formed by etching the upper layer has a multidirectional two-dimensional shape, which distributes the stress and prevents the intermediate layer from being locally ruptured.

That is to say, in preferred embodiments of the present invention, the groove formed by etching the upper layer has a multidirectional planar shape, which can lengthen the groove and also distribute the stress in multiple directions, as compared to when a groove with a straight line is etched in a region having the same distance. This stress distribution prevents the intermediate layer from being locally ruptured, the beam portion from being broken off due to the rupture of the intermediate layer, and the weight portion from jutting out from the substrate due to the breaking-off of the beam portion. Consequently, the manufacturing yield can be improved. The prevention of the jutting-out of the weight portion can reduce a wear on a manufacturing apparatus. This reduces the frequency of maintenance of the manufacturing apparatus, which achieves a stable lot flow.

In a preferred embodiment of the present invention, the groove formed by etching the upper layer preferably has a substantially meandering shape, a substantially sawtooth shape, or a substantially wavy shape, for example, when viewed in plan. Since these shapes distribute stress more effectively, the advantages described above can be provided with greater certainty.

When an SOI substrate including the upper layer and the lower layer made of silicon and the intermediate layer made of silicon oxide is used to manufacture an external force detection device, the external force detection device can be easily and precisely manufactured due to the advantages described above because various patterns can be precisely formed in the SOI substrate.

Other features, elements, characteristics and advantages of the present invention will become more apparent from the following detailed description of preferred embodiments of the present invention with reference to the attached drawings.

BRIEF DESCRIPTION OF THE DRAWINGS

FIGS. 1A and 1B are an exploded perspective view and a sectional view, respectively, of an external force detection device according to a preferred embodiment of the present invention.

FIGS. 3A to 3G are sectional views showing a method for manufacturing the external force detection device according to a preferred embodiment of the present invention.

DETAILED DESCRIPTION OF PREFERRED EMBODIMENTS

Figure 2A:
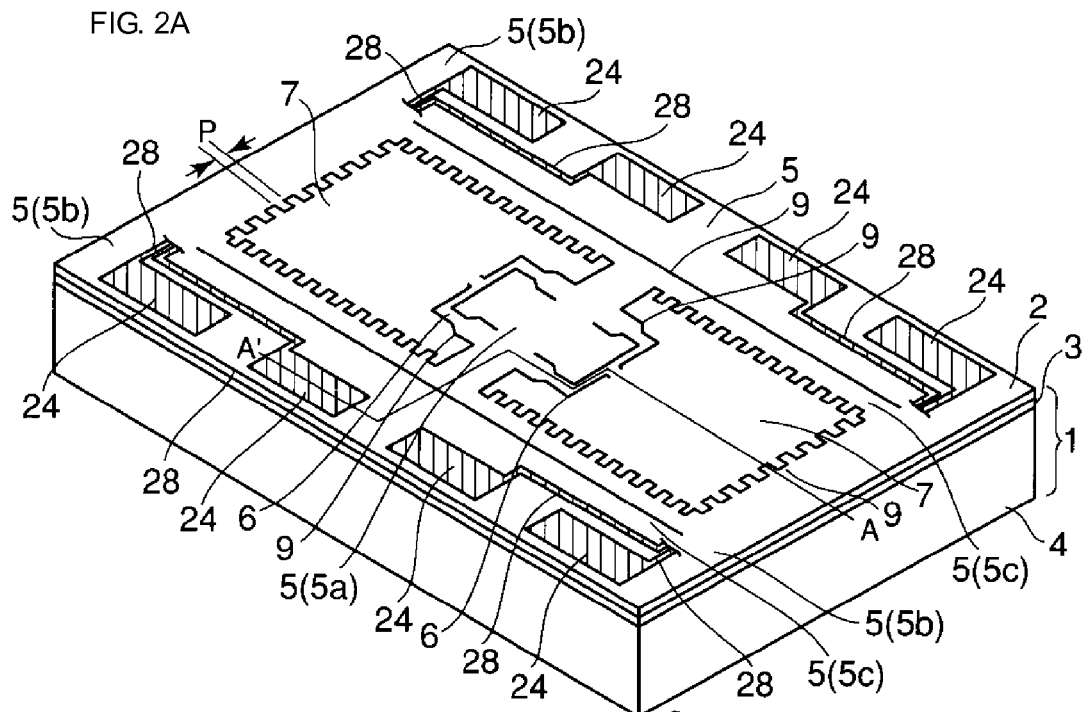
FIGS. 2A and 2B are a perspective view and a plan view, respectively, showing an acceleration detector of the external force detection device according to a preferred embodiment of the present invention.

Preferred embodiments of the present invention will now be described with reference to the drawings. In the description of the preferred embodiments, the same components or portions as those of the related art are designated by the same reference numerals and the duplicate descriptions thereof will not be repeated.

FIG. 1A is an exploded perspective view showing the structure of an acceleration sensor, which is an external force detection device according to a first preferred embodiment of the present invention. As shown in the FIG. 1A, the external force detection device of the first preferred embodiment includes an acceleration detector 20 having weight portions 7, supporting portions 5 (5a, 5b, and 5c), and beam portions 6 provided in an SOI substrate 1. FIG. 1B is a sectional view of the acceleration detector 20 taken along line A-A' of FIG. 2A.

As shown in the FIG. 1B, a glass base 11, a substantially frame-shaped polyimide layer 12, the acceleration detector 20 having the weight portions 7, the beam portions 6, and the supporting portions 5 provided in the SOI substrate 1, a substantially frame-shaped polyimide layer 14, and a substantially plate-shaped polyimide layer 16, and a glass substrate 17 are sequentially stacked in the acceleration sensor of this preferred embodiment. The glass base 11 and the glass substrate 17 protect the acceleration detector 20 from an external force or an ambient environment.

In FIG. 1B, reference numerals 18, 25, 23, and 24 denote a protective layer, a piezoresistor, low-resistance wires, and metal wires, respectively.

Figure 2B:
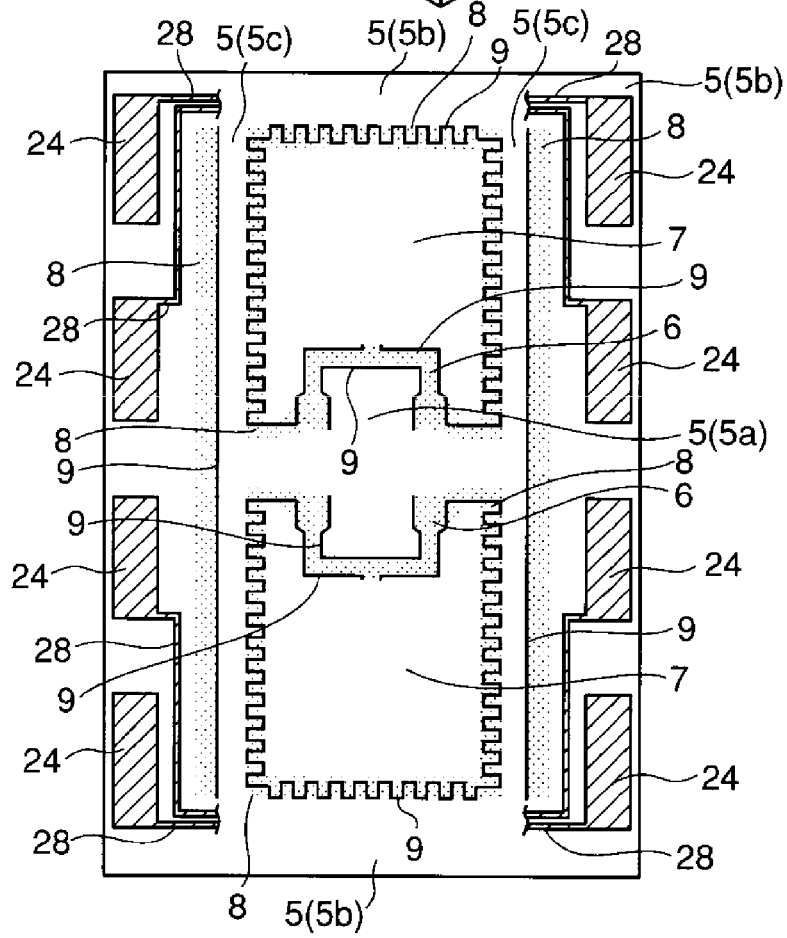

FIG. 2A is a perspective view of the acceleration detector 20 of the acceleration sensor according to this preferred embodiment and FIG. 2B is a plan view thereof. In FIG. 2B, the regions in which a lower layer 4 and an intermediate layer 3 of the SOI substrate 1 are partially removed in plan view are shown by the shading dots.

As shown in the FIGS. 2A and 2B, the two weight portions 7 provided in the acceleration detector 20 preferably have an axisymmetric shape and are arranged so as to face each other. The supporting portion 5b is provided in a periphery of the acceleration detector 20 so as to be substantially frame shaped. The supporting portions 5c extend in the vertical direction as shown in FIG. 2B, whose upper ends and lower ends are connected to the supporting portion 5b, so as to sandwich the weight portions 7 from the left and right sides thereof as shown in FIG. 2B. The supporting portion 5a is provided in the central portion of the acceleration detector 20. Each of the supporting portions 5a, 5b, and 5c and each of the weight portions 7 are arranged to have a desired interval therebetween, such that a gap portion 8 is provided therebetween. The gap portion 8 corresponds to a groove 9 in an upper layer 2 of the SOI substrate 1.

Each of the weight portions 7 is connected to the supporting portion 5a through each of the beam portions 6 that preferably have a substantially angular U shape. As shown in FIGS. 1B and 2B, when the lower layer 4 and the intermediate layer 3 of the SOI substrate 1 are partially removed, the beam portion 6 is configured so as to be thinner than the weight portion 7. In the boundary between the beam portion 6 and the weight portion 7 and the boundary between the beam portion 6 and the supporting portion 5a, the groove 9 is also provided in the upper layer 2.

Wiring patterns 28 are provided on the central portion of the supporting portion 5a and on the supporting portions 5c and 5b. Each of the wiring patterns 28 connects the piezoresistor 25 (FIG. 1B) provided on the beam portion 6 to each of the metal wires 24 arranged on the both sides of the supporting portion 5b of FIG. 2B. The metal wires 24 are connected to an external power source, ground, and other suitable components. The wiring patterns 28 are only partially shown in FIGS. 2A and 2B, and the wiring patterns 28 and the metal wires 24 are not shown in FIG. 1A.

In this preferred embodiment, the groove 9, which is formed in the gap portion 8 between the weight portion 7 and the supporting portions 5b and 5c and surrounds the weight portion 7 so as to have a substantially angular U shape, preferably has a substantially meandering shape in which the groove 9 has a multidirectional two-dimensional shape as shown in FIGS. 2A and 2B. The groove width of the groove 9 is preferably about 1 μm to about 10 μm, for example, and the pitch (P in FIG. 2A) is about 10 μm to about 100 μm, for example. Wall surfaces of the groove 9 have a three-dimensional configuration.

A manufacturing method according to a preferred embodiment of the present invention will now be described with reference to FIGS. 3A to 3G. An SOI substrate 1 shown in FIG. 3A is prepared first. A piezoresistor 25, a metal wire 24 extending from the piezoresistor 25, and a protective layer 18 are then formed in predetermined locations as shown in FIG. 3B. Low-resistance wires 23 for an active layer are optionally formed. Conventionally used technologies for manufacturing silicon semiconductors are utilized to form a resistor and wires.

As shown in FIG. 3C, a polyimide layer 14 is formed on the SOI substrate 1 to provide a space above a weight portion 7, such that the weight portion 7 is movable within the space. For example, the polyimide layer 14 can preferably be formed using a photolithographic technique through application, pattern formation, and curing. That is to say, a polyimide solution is preferably applied to the SOI substrate 1 by spin coating so as to have a thickness of about 3 μm to about 20 μm, for example, in accordance with the space to be formed. With photosensitive polyimide, a cavity pattern is formed using a photolithographic technique. With non-photosensitive polyimide, polyimide is post-baked, and then etched through a photoresist mask pattern. The pattern formation of polyimide is completed by removing the photoresist.

As shown in FIG. 3D, an upper layer 2 and a protective layer 18 are etched with a first etching gas to form a groove 9 in appropriate locations such as a gap portion 8 between a weight portion 7 and supporting portions 5, a gap portion 8 between a supporting portion 5b and a supporting portion 5c, and a boundary between a beam portion 6 and the weight portion 7. In this preferred embodiment, the groove 9 which is formed in the gap portion 8 between the weight portion 7 and the supporting portions 5b and 5c and which surrounds the weight portion 7 so as to have a substantially angular U-shape has a substantially meandering shape in which the groove 9 has a multidirectional two-dimensional shape as shown in FIGS. 2A and 2B. The groove 9 can preferably be formed by either dry etching or wet etching, for example, and the photoresist used in the etching step is preferably removed by cleaning after the etching step.

After a polyimide layer 16 is formed on a glass substrate 17, the glass substrate 17 is fixed on an acceleration detector 20 through the polyimide layer 16 as shown in FIG. 3E. This is preferably performed by thermocompression bonding at a temperature range of about 250° C. to about 400° C., for example, that does not affect metal wires or other components formed on the SOI substrate 1. The compression pressure is set to be an appropriate value depending on the formation conditions of polyimide layer 14, for instance, the thickness of the polyimide layer 14. For example, the glass substrate 17 and the acceleration detector 20 can preferably be bonded together under a pressure of at least about 0.5 MPa.

As shown in FIGS. 3F and 3G, a step of etching a lower layer is conducted and a step of etching an intermediate layer is then conducted as in the related art. The lower layer 4 is etched such that the etched portion is wider than the groove 9 to avoid interfering with the groove 9 formed in the upper layer 2. In these etching steps, dry etching is preferred and the photoresist is removed by dry processing, such as ashing, for example, after the step of etching the lower layer.

After a polyimide layer 12 is formed on a glass base 11, the acceleration detector 20 is fixed on the glass base 11 with the polyimide layer 12 interposed therebetween to complete an acceleration sensor shown in FIG. 1B. This is preferably performed by thermocompression bonding at the same or substantially the same temperature as in the case in which the acceleration detector 20 and the glass substrate 17 are bonded or at a temperature less than that temperature.

In this preferred embodiment, when acceleration is applied to the acceleration sensor manufactured as described above, the weight portion 7 is displaced to cause the beam portion 6 to deform. The resistance value of the piezoresistor 25 formed on the beam portion 6 in the case in which acceleration is applied is changed from the resistance value of the piezoresistor 25 in the case in which acceleration is not applied, whereby the acceleration is detected. Since the basic principle of detecting acceleration is the same as that described in, for example, Japanese Patent No. 3956999, further detailed description will not be provided.

In this preferred embodiment, the groove 9 that is formed by etching the upper layer 2 in the gap portion 8 between the weight portion 7 and the supporting portions 5b and 5c preferably has a substantially meandering shape in plan view, which effectively lengthens the groove 9. Furthermore, the groove 9 has a multidirectional planar shape, which distributes stress in multiple directions that is applied to the intermediate layer 3 in the gap portion 8. This prevents rupturing of the intermediate layer 3 during manufacturing. Therefore, known problems, such as damage to the beam portion 6 or jutting-out of the weight portion 7, are prevented.

The present invention is not limited to the preferred embodiments described above and various modifications can be made. For example, in the structure in which the groove 9 surrounds the weight portion 7 so as to have a substantially angular U-shape, the groove width, the shape, the pitch, and other characteristics of the groove 9 formed in the gap portion 8 between the weight portion 7 and the supporting portions 5b and 5c are not specifically limited. For instance, FIGS. 4A to 4D are plan views showing modifications of the groove 9 formed in the gap portion 8 between the weight portion 7 and the supporting portions 5b and 5c as well as the groove 9 formed in a boundary between the beam portion 6 and the weight portion 7.

Figure 4A:
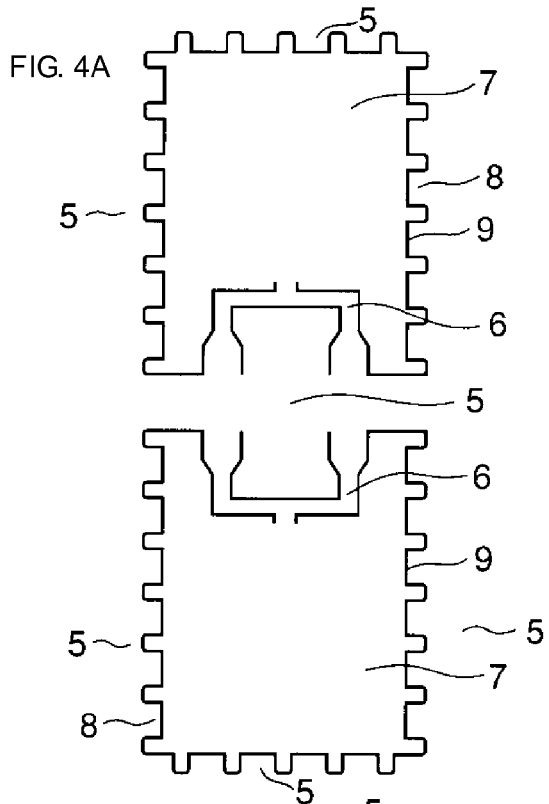
FIGS. 4A to 4D are plan views showing a groove formed around a weight portion and around a beam portion on an acceleration detector of an external force detection device according to another preferred embodiment of the present invention.
Figure 4B:
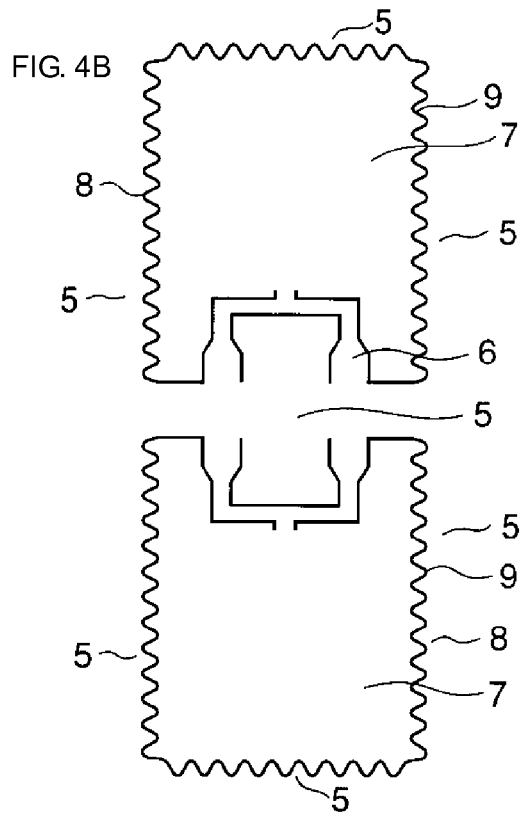
Figure 4C:
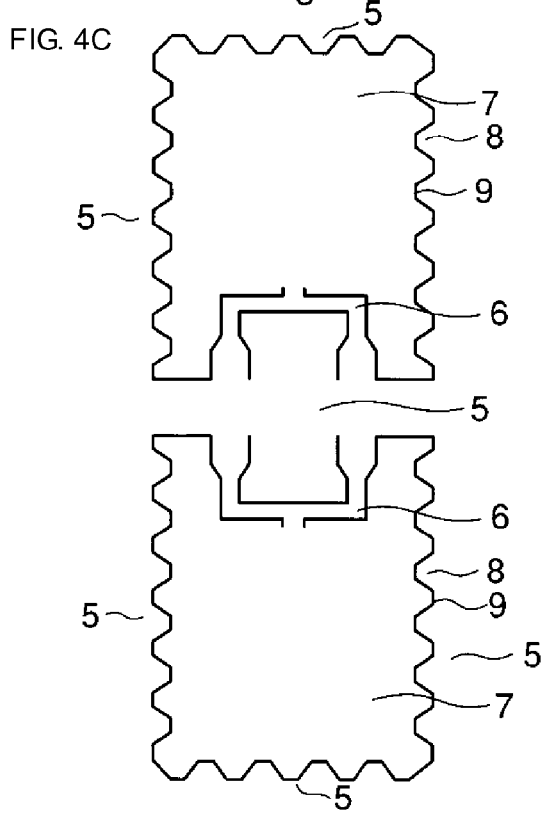
Figure 4D:
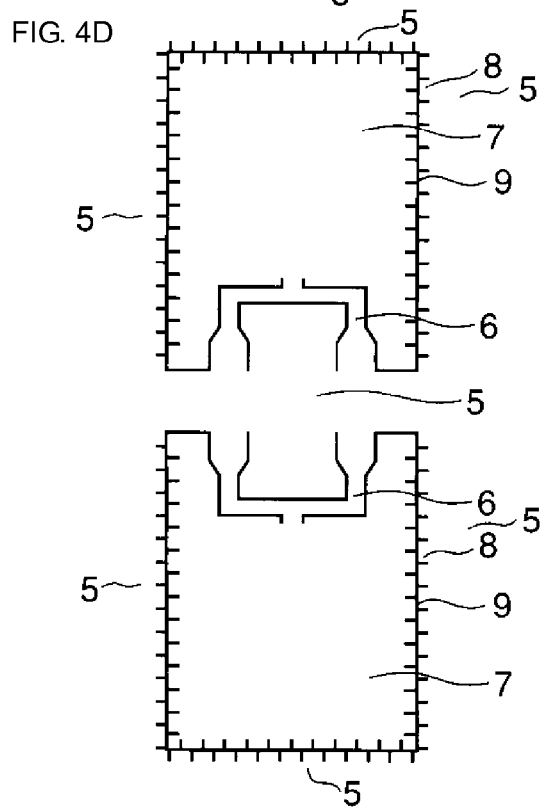
Figure 5A:
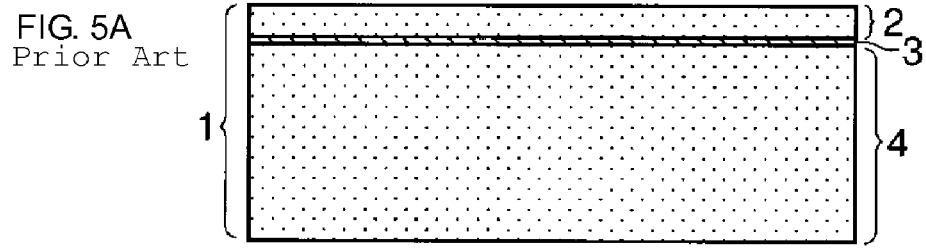
FIGS. 5A to 5E show an example of a method for manufacturing an external force detection device in the related art.
Figure 5B:
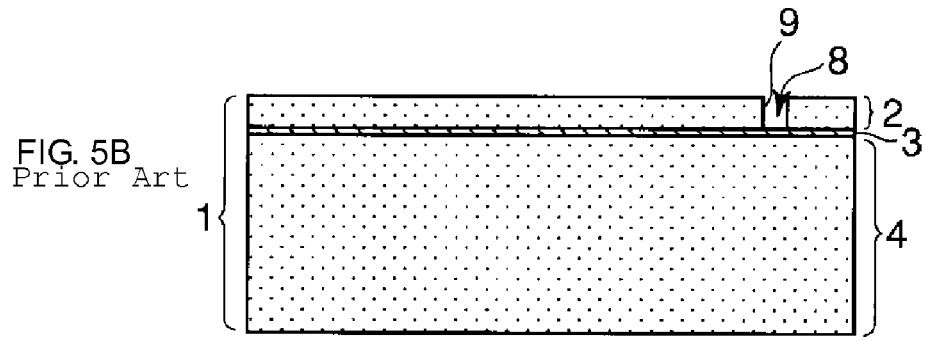
Figure 5C:
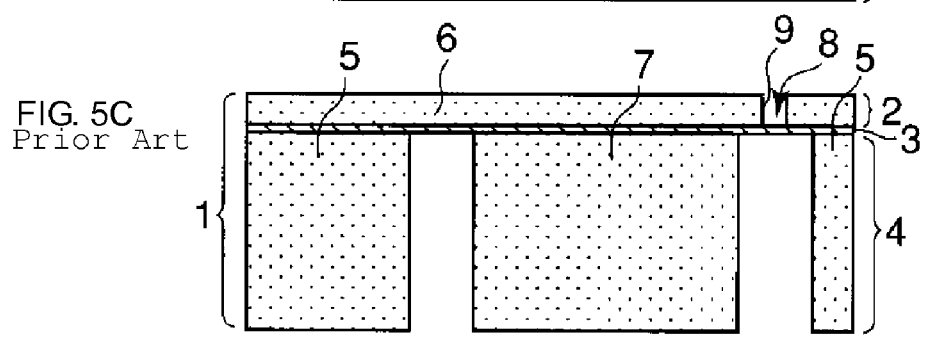
Figure 5D:
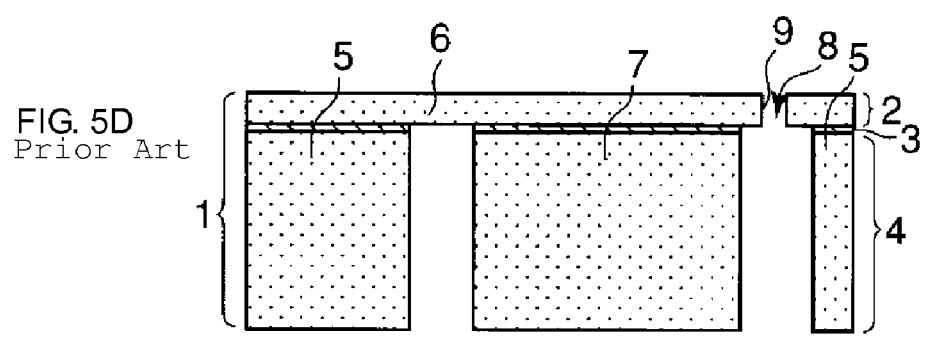
Figure 5E:
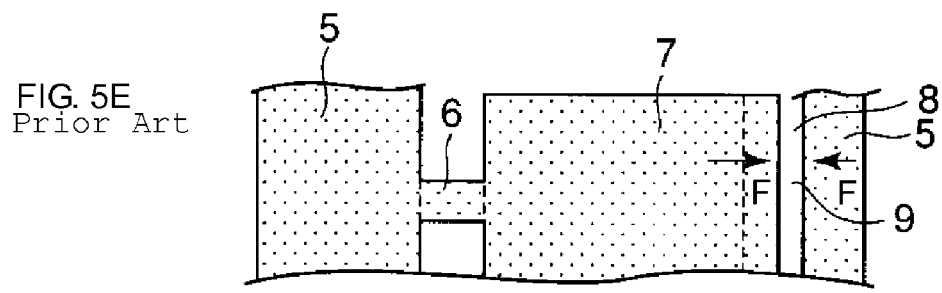

FIG. 4A shows an example of a groove 9 having a substantially meandering shape whose pitch is different from that in the preferred embodiment described above. FIG. 4B shows an example of a groove 9 having a substantially wavy shape. FIG. 4C shows an example of a groove 9 having a substantially sawtooth shape. The formation of these grooves 9 provides the same or substantially the same advantages as those in the preferred embodiment described above. FIG. 4D shows an example of a groove 9 having a substantially ladder shape (short straight lines are alternately arranged on both sides of a long straight line). Such a combination of straight lines can significantly improve the manufacturing yield by providing the above-described multidirectionality, as compared to the case in which the groove 9 is formed in a straight line as in the related art.

In the preferred embodiments described above, the acceleration detector 20 is sandwiched by the glass substrate 17 and glass base 11 with the polyimide layer 12 and the polyimide layers 14 and 16 interposed therebetween. However, a structure above, below, or around the acceleration detector 20 is not specifically limited. It is important to provide a space in which the weight portion 7 can move. Therefore, recessed portions may be provided in the glass substrate 17 and the glass base 11 such that the weight portion 7 can move. The external force detection device is preferably configured such that the acceleration detector 20 is protected.

In the external force detection device of preferred embodiments of the present invention, such as the acceleration sensor, the shape of the weight portion 7, the supporting portions 5, and the beam portion 6 and the arrangement of the piezoresistor 25 are not specifically limited. It is important to include a structure arranged to detect an external force in which the weight portion 7 is displaced in accordance with an external force to be detected to cause the beam portion 6 to deform. Therefore, the weight portion 7 may preferably be doubly supported and connected to the supporting portions 5 through the beam portions 6 (that is, the weight portion 7 is connected through the two beam portions 6 to the two supporting portions 5 arranged beside the weight portion 7).

In the preferred embodiment described above, the acceleration detector 20 including the weight portion 7, the supporting portions 5, and the beam portion 6 includes the SOI substrate having the upper layer 2 and the lower layer 4 made of silicon and the intermediate layer 3 made of silicon oxide. However, the substrate in which the weight portion 7, the supporting portions 5, and the beam portion 6 are provided is not necessarily the SOI substrate 1. The intermediate layer 3 arranged below the beam portion 6 may remain without being removed by etching in accordance with the material or structure of the substrate.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. An external force detection device comprising:
a substrate including an upper layer, a lower layer, and an intermediate layer interposed between the upper layer and the lower layer; wherein
the substrate includes:
a weight portion;
a supporting portion arranged so as to be spaced away from the weight portion; and
a beam portion thinner than the weight portion in a stacking direction in which the upper layer, the intermediate layer, and the lower layer of the substrate are stacked, the beam portion connecting the supporting portion to the weight portion at least one connecting point;
a space in which the weight portion can move is provided around the weight portion;
the weight portion is displaced in accordance with an external force to cause the beam portion to deform; and
an etched groove is provided in at least the upper layer and the lower layer of the substrate and defines a gap portion between the weight portion and the supporting portion, and wall surfaces of the etched groove have a three-dimensional structure.

2. The external force detection device according to claim 1, wherein the etched groove has one of a meandering shape, a sawtooth shape, or a wavy shape when viewed in plan view.

3. The external force detection device according to claim 1, wherein the substrate is a silicon-on-insulator substrate including the upper layer and the lower layer made of silicon and the intermediate layer made of silicon oxide.

4. The external force detection device according to claim 1, wherein the etched groove is provided in the upper layer, the intermediate layer, and the lower layer of the substrate.

5. The external force detection device according to claim 1, wherein the beam portion includes only the upper layer of the substrate.

6. The external force detection device according to claim 1, wherein the weight portion includes the upper layer, the intermediate layer, and the lower layer of the substrate.

* * * * *